W. FULTON.
Lamp Stove.
No. 37,092.
Patented Dec. 9, 1862.
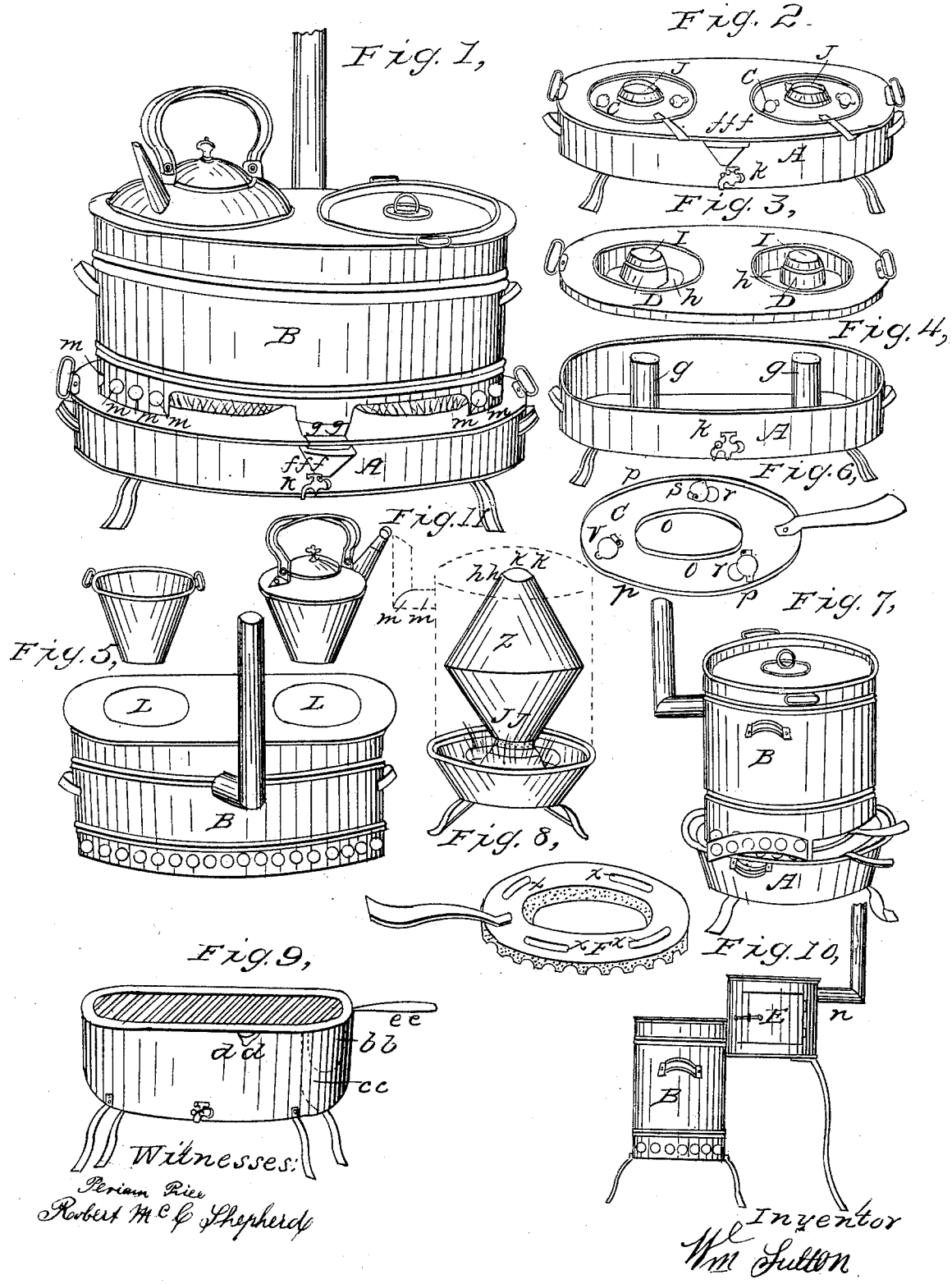
Witnesses:
Periam Rice
Robert McG Shepherd
Inventor
Wm Fulton

UNITED STATES PATENT OFFICE.

WILLIAM FULTON, OF ELIZABETH, NEW JERSEY.

IMPROVEMENT IN COOKING APPARATUS.

Specification forming part of Letters Patent No. 37,092, dated December 9, 1862.

*To all whom it may concern:*

Be it known that I, WILLIAM FULTON, of Elizabeth, in Union county, in the State of New Jersey, have invented a new Improvement on my House and Camp Stove, for which Letters Patent of the United States were issued to me on the 4th day of February, 1862; and I do hereby declare that the following is a full, clear, and exact description thereof, reference being had to the accompanying drawings, and to the letters of reference marked thereon, making a part of this specification, in which—

Figure 1 is an external view of my invention with the jacket applied to it and in operation. Fig. 2 is an external view of the water apartment with the lid to which the fuel-basins are attached applied to it and the extinguishers on. Fig. 3 is a detached view of the lid of the water-apartment, showing the interior of the fuel-basins. Fig. 4 is an external view of the water-apartment. Fig. 5 is a detached view of the jacket. Fig. 6 is a view of the extinguisher. Fig. 7 is an external view of my invention formed single. Fig. 8 is a view of a circular cone for decomposing the oil into gas. Fig. 9 is a view of a grate of the same shape as the jacket, which can be used in place of the fuel-basins. Fig. 10 is an end view of the jacket with an oven attached to it. Fig. 11 is a view of my invention, showing the construction of the heater which is used for heating rooms and the action of the fuel on the same.

Similar letters of reference indicate corresponding parts in the several figures.

This invention relates to an improvement in house and camp stoves for preparing meals and heating rooms in the shortest space of time possible and with the least trouble.

The object of the invention is to adapt a portable stove for heating rooms or for frying and boiling or stewing at the same time with less labor, less expense, and more expeditiously than can be accomplished by any other means in use. This object is attained by using an open lamp or coal-oil grate, over which a jacket of any desired form may be placed, two or more openings being made in the top of the jacket as receptacles for tea-kettle and other necessary apparatus. Coal-oil, alcohol, naphtha, crude petroleum, or crude coal-oil is required for fuel, so that a fire can be instantly produced. The fire passing up against the apparatus in which the food is placed quickly prepares whatever may be in them for the table, a meal being thus gotten ready in from six to nine minutes at the small expense of one cent and a half.

To enable those skilled in the art to fully understand and construct my invention, I will proceed to describe it.

A represents a reservoir of an oblong form, which may be constructed of tin or other suitable material. Through the bottom of this reservoir two or more tubes pass, as shown at $g$ in Fig. 4. A lid, as shown in Fig. 3, fits over this reservoir, as shown in Fig. 2, or it can be made fast, in which case a spout, $fff$, (shown in Figs. 1 and 2,) is formed in the reservoir, so that the water can be poured in, it being drawn off by means of faucet K. (Shown in Figs. 1 and 2.) In this lid two or more fuel-basins are placed, as shown in Fig. 3, which are formed out of one piece of brass, copper, or other suitable material. Two or more cones are raised in the center of these basins, so as to form a channel as a receptacle for the fuel, as shown at $h$ in Fig. 3. When the lid is placed on reservoir A, the top of the cones being open, as shown at I in Fig. 3, they come directly contiguous with tubes $g$ in reservoir A, as shown at J in Fig. 2, so that the oxygen of the air, passing through tubes $g$ and openings $i$ in cones D, arises and unites with the carbon and hydrogen of the fuel when burning, thereby spreading the flame and causing it to act with a greater degree of intensity on the bottom of whatever receptacles for food are placed in the top of the jacket.

The object of surrounding the fuel with water is to prevent its too rapid consumption when such substances as alcohol, coal-oil, or naphtha are used, and it is at the same time ready heated for dish-water, a faucet being placed at the lower part of the reservoir, so as to draw it off, as shown at K in Figs. 1 and 4. A grate can be used in the place of reservoir A, as shown in Fig. 9, which can likewise be applied to any stove, $b\,b$ being the oil-apartment, and $c\,c$ the water-apartment, the water being poured in at $d\,d$.

On the top there is a double row of flat bars forming a shut-off similar to those used on ordinary stoves. By bringing handle e e out it opens so that the flame readily passes between the bars. By pushing handle c e inward the flame is totally extinguished.

B is the jacket, which can be constructed of sheet metal, and made of any desirable shape, with sufficient room for any desirable number of vessels, pans, &c. The inner surface can be coated with a mixture of plaster-of-paris, if requisite, so as to form a non-conductor of it to prevent the heat from escaping. In the top of this jacket two or more openings are made, as shown at L in Fig. 5, in which a teakettle, stewing-pan, &c., can be placed, as shown in Fig. 1, the bottom of said vessels coming within an inch of the top of cone D.

In the lower part of jacket B openings m are made, as shown in Figs. 1 and 5, through which the air is admitted, thereby causing a more intense heat and quickening the process of boiling. The jacket rests on reservoir A, as shown in Fig. 1, it being secured and kept from tilting backward by means of lip g g, catching under the rim of the reservoir, as shown in Fig. 1. A bake-oven can be attached to this jacket, as shown at E in Fig. 10, in which case the pipe enters the bakeoven, as shown at n in Fig. 10.

When used for heating rooms, a heater is placed within the jacket, as shown at Z in Fig. 11, the upper part of the heater being connected to the lid of the jacket, as shown at h h, so that it is suspended over the flame, the lower part being kept to its place by means of a perforated tube, which is passed up pipe g in Fig. 4 into the lower part of the heater, as shown at J J in Fig. 11. When desirable to apply the extinguisher this tube can be easily lowered. The cold air passes up through pipe g, which is fixed in the reservoir, into the interior of the heater Z, it being there made intensely hot prior to passing out at opening K K into the room, the perforated tube J J allowing the cold air to escape through it in order to combine with the flame, thereby spreading the flame and helping to support combustion, and at the same time preventing the smoke from passing into the heater, it being carried away by means of pipe m m. The heater Z is so constructed that the greatest possible heating-surface is obtained, so that whatever air passes through it is quickly heated, thereby saving the heat that would otherwise be lost if only the jacket were used.

C is the extinguisher, which can be made of copper or other proper material. A hole is made in the center and the edge turned up all round, as shown at o in Fig. 6. The outer edge is likewise turned up, as shown at p in Fig. 6, so that it fits tightly round the cone and basin and fills up the channel which holds the fuel, as shown in Fig. 2, an offset being made in the cone, as shown at D in Fig. 3, so that the extinguisher can rest upon and fit tightly round it. Without the water surrounding the flame it is impossible to extinguish it at will. In this extinguisher two or more openings are made, as shown at r in Fig. 6, and a plate is placed over them, which works on a rivet, as shown at s in Fig. 6. When requisite to totally extinguish the flame, these plates are brought directly over openings r, as shown at v in Fig. 6. When a small blaze is required, so as to keep the food warm, these plates can be brought clear of openings r, and the flame permitted to burn through said openings.

F represents a cone similar in shape to the extinguisher C. It can be made of similar material and rounding on the top, as shown in Fig. 8. The blaze is thus concentrated in the top of it, and a gas-light is thus caused to burn through openings x in Fig. 8, the air being supplied from the interior and the exterior.

This stove can be made of any desired form or size, either double, as herein described, or single, as shown in Fig. 7.

This invention is useful to families and excursion-parties, in military-camps, hotels, or wherever it is desirable to get up a meal quickly and with little labor. It will likewise be found to be very advantageous in oyster-saloons, and for heating rooms quickly and cheaply.

Having thus described my invention, and the manner in which the same is or may be used or carried into effect, I would observe, in conclusion, that I do not confine or restrict myself to the precise details or arrangements which I have had occasion to describe or refer to, as variations may be made therefrom without deviating from the main features of my said invention; but

What I consider to be new, and desire to secure by Letters Patent, is—

1. The construction of the valves in extinguisher C, or their equivalent, as shown at s and v in Fig. 6, for producing a gas-light and regulating the action of the flame, either partially or wholly extinguishing it.

2. The construction of cones D, or their equivalent, as shown in Fig. 3, for spreading the flame and admitting the air thereto, in combination with the extinguisher C. (Shown in Fig. 6.

3. The cone F, or its equivalent, as shown in Fig. 8, for producing a gas-light from the fuel when placed over cone D and fuel-chambers h.

4. The fuel-chambers h, or their equivalent, as shown in Fig. 3, in combination with pipes g in Fig. 4, for heating the water in reservoir A, the whole being arranged substantially as and for the purpose herein set forth.

WM. FULTON.

Witnesses:
PERIAM PRICE,
ROBERT McC. SHEPHERD.